2,843,455
Patented July 15, 1958

2,843,455

PURIFICATION OF ALUMINUM CHLORIDE

William A. Pardee, Fox Chapel, Pa., assignor to Gulf Research & Development Company, Pittsburgh, Pa., a corporation of Delaware No Drawing. Application July 21, 1955
Serial No. 523,610

5 Claims. (Cl. 23—93)

This invention relates to purification of anhydrous aluminum chloride, and more particularly to a process wherein anhydrous aluminum chloride containing iron chloride as an impurity is purified by contacting it at a temperature of approximately 1000° F. with a mass of permeable material carrying a deposit of metallic aluminum on its surface; wherein the iron chloride reacts during the purification stage with the metallic aluminum, consuming the same and depositing metallic iron in its place; wherein an aluminum deposit on the permeable material is regenerated by heating the permeable material to a temperature of the order of 1800° F. and contacting it at that temperature with vapors of anhydrous aluminum chloride, whereupon the iron surface is converted to iron chloride and metallic aluminum is deposited in its place; wherein the consumption and the regeneration of an aluminum surface on the permeable material are cyclically repeated according to need; and wherein the aluminum chloride vapors contacted with the said mass of permeable material during the purification stage and the aluminum chloride vapors contacted with the mass of permeable material during the regeneration stage are seperately condensed, the first-mentioned of these two being purified anhydrous aluminum chloride.

Among the several ways in which anhydrous aluminum chloride can be manufactured, one is the chlorination of aluminum ore, bauxite. Known and available ores of aluminum contain a certain amount of iron, and this iron content of the ore chlorinates no less readily than the aluminum content, producing an aluminum chloride with iron chloride present as an impurity. While this quality of anhydrous aluminum chloride is satisfactory for some uses, the presence of iron chloride renders it unacceptable for many other uses and this invention is directed to the removal of the iron chloride from the impure aluminum chloride.

Attempts have been made from time to time to purify the iron-contaminated aluminum chloride by resubliming it. A more expensive method of contacting it with refined aluminum metal has been practiced but I know of no prior operation or proposal in which aluminum metal is deposited on the surface of a supporting material and in which purification of aluminum chloride by contact therewith and subsequent regeneration of the aluminum surface on the supporting material are alternated in a repetitive cycle.

In the performance of my process, aluminum can be placed on the support by any convenient means. One such means is as follows:

The required quantity of the supporting material, e. g. bauxite, is impregnated with ferric nitrate. This material, when dry, is reduced by passing therethrough a stream of hydrogen at high temperature, e. g. 100° F., thereby producing a coating of metallic iron on the supporting medium. Vapors of anhydrous aluminum chloride at a temperature of 1800° F. are then passed through the bed of iron-coated bauxite, whereupon the coating of iron is displaced by a deposit of metallic aluminum and the iron passes out of the system as iron chloride in the aluminum chloride vapors. The aluminum chloride vapors going to the condenser during this stage of the process contain an extraordinary amount of iron chloride and so are directed to a secondary condensing zone to isolate the condensed product from the purified aluminum chloride produced during the stage of the process when the supporting material carries a coating of aluminum.

The purification of aluminum chloride by contacting it with the precipitated aluminum is performed at temperatures within the range of 700° F. to 1200° F., and bringing the mass of supporting material to that temperature after laying down the aluminum deposit at about 1800° F. can be accomplished in any one of several different ways. One way is by circulating a cool non-reactive gas through the mass of supporting material. A second way is to transfer the hot material into a tumbling chamber and dissipate the excess heat through the walls thereof. A third way would be to let the mass sit, in place, until the excess heat had been dissipated through the walls of its containing chamber.

In cooling the mass of supporting material by circulation therethrough of a cool non-reactive gas, I can use nitrogen gas, circulating it through the hot mass and then through a heat exchanger for cooling and back to point of beginning, in a closed cycle. A more advantageous procedure is to take the tail gas from the bauxite-chlorinating system, after the condensers, wash it to remove silicon and titanium compounds, and then pass this cool gas through the mass of supporting material.

When the mass of supporting material, together with its deposited aluminum is reduced to a temperature within the approximate temperature range of 700° F. to 1200° F., advantageously about 1000° F., it is ready for my process of aluminum chloride purification. At this stage vapors of the impure anhydrous aluminum chloride previously described are passed through the mass of material that carries the deposited aluminum metal. The iron chloride impurity present in these vapors reacts with the aluminum metal, the iron content of the iron chloride being deposited on the carrier material and the chlorine content of the iron chloride reacting with the metallic aluminum to produce additional aluminum chloride. The so purified vapors of aluminum chloride then pass to a condenser for final recapture. The described purification operation eventually consumes all of the metallic aluminum from the carrier material and thereupon the mass of carrier material is again heated to a temperature of the order of 1600° F. to 2000° F., advantageously 1800° F., preparatory to regeneration. This heating is conveniently accomplished by passing through the mass of carrier material a stream of heated unreactive gas such as the nitrogen gas or tail gas previously mentioned as used for a cooling medium.

The final step in the cycle is the regeneration of the aluminum coating on the carrier material, this being done at a temperature within the approximate range of 1600° F. to 2000° F. This regeneration of the aluminum coating is conducted in precisely the same manner as that previously described herein as used for the initial preparation of an aluminum coating on the carrier material. That is, reacting vapors of aluminum chloride at the specified elevated temperature with the deposited iron on the carrier material, the chlorine of the aluminum chloride vapors reacting with the deposited iron to form additional iron chloride and the metallic aluminum being deposited on the carrier material in substitution for the iron.

During the regeneration of the aluminum surface on the carrier material the vapors leaving the treating chamber will have an extraordinarily high content of iron chloride and these vapors are of course directed to a condenser separate from that used for condensing purified aluminum chloride vapors.

The following is a specific example of the practice of my invention. Using bauxite as the supporting material, I impregnate 1000 pounds of bauxite with a concentrated water solution of ferric nitrate $Fe(NO_3)_3 \cdot 9H_2O$. There is no advantage in having more than a dilayer of aluminum on the carrier material and therefore I use an amount of ferric nitrate not greatly in excess of that required to provide a dilayer of iron. The bauxite when calcined is found to have a pore surface area of 125 square meters per gram. The weight of a dilayer of iron on 1000 pounds of this bauxite will be 392 pounds and require 2840 pounds of ferric nitrate $Fe(NO_3)_3 \cdot 9H_2O$. By way of allowing an ample margin I choose to use 3400 pounds of ferric nitrate nonahydrate.

The bauxite and the water solution of iron nitrate are charged together into a vessel where they are heated and agitated. The ferric nitrate decomposes to ferric oxide when raised much above its melting point and heating is continued to dryness and until the entire surface of the bauxite is coated with ferric oxide.

The supporting material with its coating of ferric oxide is now put in the chamber in which it will subsequently be used for purification of aluminum chloride. A stream of hot unreactive gas such as nitrogen or the previously mentioned tail-gas from the chlorination of bauxite is next passed through the mass of supporting material, and this gas is not recirculated because one of its functions is to purge all oxygen from the chamber. The other primary function of this gas is to heat the mass of material up to a temperature of about 1000° F. When the supporting material has been brought to this temperature level and the chamber has been sufficiently purged, a stream of hydrogen gas at approximately 1000° F. is passed through the material to reduce the iron oxide to a deposit of metallic iron on the supporting (or carrier) material.

When the iron oxide has been fully reduced and the supporting material is coated with metallic iron, the regeneration step is prepared for by raising the temperature of the supporting material to approximately 1600° F. to 2000° F., specifically in this example 1800° F., and this is accomplished conveniently by passing a heated unreactive gas through the body of material.

In the regeneration step a deposit of aluminum is substituted for that of iron on the supporting material. That is accomplished by vaporizing aluminum chloride and passing the heated vapors at a temperature of approximately 1800° F. over the iron-carrying supporting material, whereupon the deposit of iron reacts with the chlorine of the aluminum chloride, and aluminum is deposited in its place. The theoretically requisite amount of aluminum chloride to be passed through the chamber to accomplish regeneration is 940 pounds, although I customarily use about twice this much. The requisite amount can be more accurately controlled by analysis of the aluminum chloride vapors leaving the chamber. The aluminum chloride vapors leaving the chamber during the regeneration stage contain an increased amount of iron chloride and they are therefore directed to a secondary condenser and condensed separately from purified aluminum chloride.

At the conclusion of the regeneration step the chamber contains a mass of supporting material carrying a deposit of metallic aluminum and it is at a temperature of the order of 1800° F. The next step is to circulate through the mass of material a current of cooler unreactive gas and bring the mass to a temperature of approximately 1000° F. in preparation for the purification stage of my process.

With the mass of bauxite and its deposit of metallic aluminum at a temperature of 1000° F., vapors of anhydrous aluminum chloride to be purified are passed through the material at a temperature of approximately 1000° F. In their passage through the bed of aluminum carrying bauxite, the vaporized iron chloride, present as an impurity in the vapors of aluminum chloride, reacts with the deposit of metallic aluminum and the chlorine of the iron chloride reacts with the aluminum deposit to form additional aluminum chloride while metallic iron is deposited in substitution for the metallic aluminum.

Having started with 1000 pounds of bauxite as the supporting material and assuming that, in the initial deposition of metallic iron on the supporting material, we succeeded in depositing the theoretical 392 pounds of iron, the amount of substituted aluminum on the supporting material will be sufficient to remove 1140 pounds of ferric chloride from the impure aluminum chloride vapors which are being purified. A typical aluminum chloride of the character which is made by chlorination of bauxite may contain 1.74% of ferric chloride and each cycle of my process should purify 65,000 pounds of the impure aluminum chloride, assuming that there are no other impurities present that would also react with the aluminum deposit. However the rate of the reaction between ferric chloride and deposited aluminum falls off toward the end and I find it economic in practice to terminate the purification stage of the cycle at about one-half to two-thirds of the theoretic quantity. The aluminum chloride that has been purified by this process averages 0.01% of ferric chloride.

Bauxite is the only supporting material that has been specifically mentioned so far in the description of my invention. However I find it equally practicable to use fuller's earth and other clays, silica-alumina gels, kieselguhr, coke, ammonia-synthesis catalyst, and similar inert porous materials.

The pore surface area of the supporting material is satisfactorily determined by the well known BET method developed by Brunauer, Emmett and Teller. This method was first described in detail in the Journal of the American Chemical Society, volume 60, at page 309 (1938), and is further presented and discussed in Taylor and Glasstone's Treatise on Physical Chemistry, third edition, 1951, volume 2, at page 602.

My process, as described and claimed, is applicable to the purification of aluminum chloride vapors which contain not only iron as an impurity, but also to vapors which contain iron and titanium chlorides. The regeneration step at temperatures in the range of 1600° F. to 2000° F. displaces any precipitated titanium compound as well as the iron.

I claim:

1. The repetitive two-stage cyclic process of removing iron chloride from anhydrous aluminum chloride contaminated with the same which comprises setting up an extended surface of metallic aluminum on an inert supporting material; in the first stage, passing the contaminated aluminum chloride in vapor form at a temperature approximately in the range of 700° to 1200° F. over the said surface of metallic aluminum, thereby reacting the iron chloride with the metallic aluminum and so producing additional aluminum chloride vapors and substituting a deposit of metallic iron for the metallic aluminum; in the second stage, passing additional vapors of contaminated aluminum chloride in vapor form at a temperature approximately in the range of 1600° to 2000° F. over the deposited metallic iron, thereby reacting the aluminum chloride with the metallic iron and so producing additional iron chloride vapors and substituting a deposit of metallic aluminum for the metallic iron; alternately repeating the two-stages; separating the vapors of aluminum chloride which have been reacted with metallic aluminum from those which have been reacted with metallic iron and so separately obtaining the purified aluminum chloride.

2. The continuously repetitive two-stage cyclic process of removing iron chloride from anhydrous aluminum chloride contaminated with the same which comprises setting up an extended surface of metallic aluminum on an inert supporting material; in the first stage, passing the contaminated aluminum chloride in vapor form at a temperature of approximately 1000° F. over the said surface of metallic aluminum, thereby reacting the iron chloride with the metallic aluminum and so producing additional aluminum chloride vapors and substituting a deposit of metallic iron for the metallic aluminum; in the second stage, passing additional vapors of contaminated aluminum chloride in vapor form at a temperature of approximately 1800° F. over the deposited metallic iron, thereby reacting the aluminum chloride with the metallic iron and so producing additional iron chloride vapors and substituting a deposit of metallic aluminum for the metallic iron; alternately repeating the two stages; separating the vapors of aluminum chloride which have been reacted with metallic aluminum from those which have been reacted with metallic iron and so separately obtaining the purified aluminum chloride.

3. The repetitive two-stage cyclic process of removing iron chloride from anhydrous aluminum chloride contaminated with the same which comprises setting up an extended surface of metallic aluminum on an inert supporting material; in the first stage, bringing the temperature of the metallic aluminum surface and its supporting material to a temperature approximately in the range of 700° to 1200° F.; passing the contaminated aluminum chloride in vapor form at a temperature approximately in the range of 700° to 1200° F. over the said surface of metallic aluminum, thereby reacting the iron chloride with the metallic aluminum and so producing additional aluminum chloride vapors and substituting a deposit of metallic iron for the metallic aluminum; in the second stage, raising the temperature of the deposited metallic iron and its supporting material to a temperature approximately in the range of 1600° to 2000° F.; passing additional vapors of contaminated aluminum chloride in vapor form at a temperature approximately in the range of 1600° to 2000° F. over the deposited metallic iron, thereby reacting the aluminum chloride with the metallic iron and so producing additional iron chloride vapors and substituting a deposit of metallic aluminum for the metallic iron; alternately repeating the two stages; separating the vapors of aluminum chloride which have been reacted with metallic aluminum at temperatures within the approximate range of 700° to 1200° F. from those which have been reacted with metallic iron at temperatures within the approximate range of 1600° to 2000° F., and so separately obtaining the purified aluminum chloride.

4. The continuously repetitive two-stage cyclic process of removing iron chloride from anhydrous aluminum chloride contaminated with the same which comprises setting up an extended surface of metallic aluminum on an inert supporting material; in the first stage, bringing the temperature of the metallic aluminum surface and its supporting material to a temperature of approximately 1000° F.; passing the contaminated aluminum chloride in vapor form at a temperature of approximately 1000° F. over the said surface of metallic aluminum, thereby reacting the iron chloride with the metallic aluminum and so producing additional aluminum chloride vapors and substituting a deposit of metallic iron for the metallic aluminum; in the second stage raising the temperature of the deposited metallic iron and its supporting material to a temperature of approximately 1800° F.; passing additional vapors of contaminated aluminum chloride in vapor form at a temperature of approximately 1800° F. over the deposited metallic iron, thereby reacting the aluminum chloride with the metallic iron and so producing additional iron chloride vapors and substituting a deposit of metallic aluminum for the metallic iron; alternately repeating the two stages; separating the vapors of aluminum chloride which have been reacted with metallic aluminum from those which have been reacted with metallic iron and so separately obtaining the purified aluminum chloride.

5. The repetitive two-stage cyclic process of removing iron chloride from anhydrous aluminum chloride contaminated with the same which comprises setting up an extended surface of metallic aluminum on an inert supporting material; in the first stage passing the contaminated aluminum chloride in vapor form at a temperature below the melting point of aluminum over the said surface of metallic aluminum, thereby reacting the iron chloride with the metallic aluminum and so producing additional aluminum chloride vapors and substituting a deposit of metallic iron for the metallic aluminum; in the second stage, passing additional vapors of contaminated aluminum chloride in vapor form at a temperature above approximately 1600° F. and below the melting point of iron over the deposited metallic iron, thereby reacting the aluminum chloride with the metallic iron and so producing additional iron chloride vapors and substituting a deposit of metallic aluminum for the metallic iron; alternately repeating the two stages; separating the vapors of aluminum chloride which have been reacted with metallic aluminum from those which have been reacted with metallic iron and so separately obtaining the purified aluminum chloride.

References Cited in the file of this patent

UNITED STATES PATENTS

| | | |
|---|---|---|
| 409,668 | Castner | Aug. 27, 1889 |
| 1,645,143 | Humphrey et al. | Oct. 11, 1927 |
| 1,837,199 | Brode | Dec. 22, 1931 |
| 2,348,770 | Welinsky et al. | May 16, 1944 |

OTHER REFERENCES

Mellor: "Comprehensive Treatise on Inorganic and Theoretical Chemistry," vol. 14, pages 40; vol. 5, page 316; Longman's Green & Company, New York 1924.

UNITED STATES PATENT OFFICE
CERTIFICATE OF CORRECTION

Patent No. 2,843,455            July 15, 1958

William A. Pardee

It is hereby certified that error appears in the printed specification of the above numbered patent requiring correction and that the said Letters Patent should read as corrected below.

Column 1, line 68, for "100° F." read -- 1000° F. --; column 4, line 21, for "65,000 pounds" read -- 65,600 pounds --.

Signed and sealed this 16th day of September 1958.

(SEAL)
Attest:
KARL H. AXLINE
Attesting Officer

ROBERT C. WATSON
Commissioner of Patents